United States Patent
Widawski

(10) Patent No.: US 6,533,815 B1
(45) Date of Patent: Mar. 18, 2003

(54) OPTICAL LENS IN TRANSPARENT ORGANIC POLYMER MATERIAL WITH HIGH REFRACTIVE INDEX AND HIGH ABBE NUMBER

(75) Inventor: Gilles Widawski, Paris (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 09/452,486

(22) Filed: Dec. 1, 1999

Related U.S. Application Data

(63) Continuation of application No. PCT/FR99/00725, filed on Mar. 29, 1999.

(30) Foreign Application Priority Data

Apr. 3, 1998 (FR) ............................................. 98 04189

(51) Int. Cl.⁷ ................................................. A61F 2/16
(52) U.S. Cl. ....................... 623/6.56; 351/159; 526/281
(58) Field of Search ........................... 351/159; 560/26; 526/281; 623/6.56

(56) References Cited

U.S. PATENT DOCUMENTS

| | | | |
|---|---|---|---|
| 3,660,521 A | | 5/1972 | Dann et al. .................... 260/75 |
| 5,182,360 A | * | 1/1993 | Jacobine et al. ............ 528/205 |
| 5,955,206 A | * | 9/1999 | Okazaki et al. |
| 6,313,251 B1 | * | 11/2001 | Toh et al. .................... 526/308 |

FOREIGN PATENT DOCUMENTS

| | | |
|---|---|---|
| FR | 2068711 | 8/1971 |
| WO | WO 88/02902 | 4/1988 |
| WO | WO 95/00557 | 1/1995 |
| WO | WO 95/00869 | 1/1995 |

* cited by examiner

*Primary Examiner*—Paul Prebilic
(74) *Attorney, Agent, or Firm*—Fulbright & Jaworski L.L.P.

(57) ABSTRACT

The current invention discloses an ophthalmic lens composed of a transparent organic polymer material with a high refractive index and a high Abbe number by copolymerization of a mixture of monomers comprising at least one polythiol monomer and at least one monomer with a high Abbe number comprising two to four bridged cyclic end groups comprising an intracyclic ethylenic double bond or a linear or branched aliphatic residue comprising an ethylenic unsaturation, preferably a vinyl or ethylidene group bonded directly to a carbon of the ring.

17 Claims, No Drawings

OPTICAL LENS IN TRANSPARENT ORGANIC POLYMER MATERIAL WITH HIGH REFRACTIVE INDEX AND HIGH ABBE NUMBER

This application is a continuation of international application number PCT/FR99/00725 filed Mar. 29, 1999, which claims priority from French Application No. 98/04189 filed Apr. 3, 1998.

The subject-matter of the present invention is optical lenses, in particular ophthalmic lenses formed from a transparent organic polymer material with a high refractive index and a high Abbe number.

The term "optical lenses with a high refractive index" means optical lenses with a refractive index of greater than or equal to 1.55 and preferably greater than 1.57.

Optical lenses according to the invention are preferably spectacle glasses.

Ophthalmic lenses with a high refractive index must have all the following characteristics:

- a high transmission (transmission generally of greater than 85% and preferably of greater than or equal to 90%), with an absence of or optionally a very low light scattering,
- a high Abbe number of greater than or equal to 30 and preferably of greater than or equal to 35, in order to avoid chromatic aberrations,
- a low yellowing index and an absence of yellowing over time,
- good impact strength (in particular according to the CEN and FDA standards),
- good suitability for various treatments (shock-proof primer, anti-glare or hard coating deposition, and the like) and in particular good suitability for colouring,
- a glass transition temperature value preferably of greater than or equal to 80° C. and better still of greater than 80° C., preferably of between 90 and 110° C.

In addition, the polymerizable compositions for the manufacture of optical lenses must also be easy to process industrially.

In particular, it is desirable for the compositions to be able to be quickly polymerized, in particular photopolymerized, in order to reduce the cycle times in the manufacture of the lenses.

It has been found, according to the invention, that it is possible to obtain an optical lens made of transparent organic polymer material with a high refractive index and a high Abbe number by copolymerization of a mixture of monomers comprising at least one polythiol monomer and at least one monomer with a high Abbe number comprising two to four bridged cyclic end groups comprising an intracyclic ethylenic double bond or a linear or branched aliphatic residue comprising an ethylenic unsaturation, preferably a vinyl or ethylidene group bonded directly to a carbon of the ring.

The bridged cyclic end groups can be noncondensed or condensed cyclic groups.

It is recommended that the bridged cyclic end groups should be chosen from the groups of formulae:

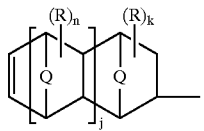

where n is an integer from 0 to 5 inclusive, k is an integer from 0 to 3 inclusive and j is an integer from 0 to 10 inclusive, and

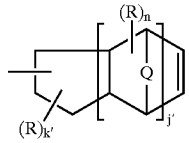

where n is an integer from 0 to 5 inclusive, k' is an integer from 0 to 2 inclusive and j' is an integer from 0 to 10 inclusive, Q represents a —C(R')$_2$—, —O—, —S—, —NR'— or —SO$_2$— group, with R' denoting H or a $C_1$–$C_3$ alkyl radical, preferably CH$_3$, and R is a hydrogen atom or a $C_1$–$C_3$ alkyl radical, preferably CH$_3$.

Mention may be made, among the recommended groups above, of groups of formulae

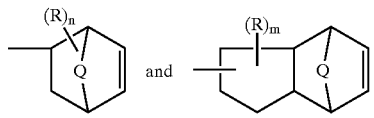

in which Q represents —C(R')$_2$—, —O—, —S—, —SO$_2$— or —NR'—, R' representing a hydrogen atom or a $C_1$–$C_3$ alkyl radical, preferably CH$_3$, R is a hydrogen atom or a $C_1$–$C_3$ alkyl, preferably CH$_3$, n=0 to 5 and m=0 to 8.

Preferably, Q represents the —CH$_2$— radical.

Preferably again, a monomer with a high Abbe number is chosen, the refractive index of which is at least 1.56.

Polythiol monomers which are suitable for the lenses according to the present invention are well known in the art and can be represented by the formula R$_1$(SH)$_{n^1}$ in which n$^1$ is an integer of 2 or more, preferably from 2 to 5, and R$_1$ is an aliphatic, aromatic or heterocyclic radical.

The polythiol compound is preferably a dithiol, trithiol or tetrathiol compound, in particular a polythiol with a high Abbe number.

These polythiol compounds are well known in the art and are disclosed, inter alia, in Document EP 394,495.

Mention may be made, among dithiols of use in the present invention, of 9,10-anthracenedimethanethiol, 1,11-undecanedithiol, 4-ethylbenzene-1,3-dithiol, 1,2-ethanedithiol, 1,8-octanedithiol, 1,18-octadecanedithiol, 2,5-dichlorobenzene-1,3-dithiol, 1,3-(4-chlorophenyl) propane-2,2-dithiol, 1,1-cyclohexanedithiol, 1,2-cyclohexanedithiol, 1,4-cyclohexanedithiol, 1,1-cycloheptanedithiol, 1,1-cyclopentanedithiol, 4,8-dithiaundecane-1,11-dithiol, dithiopentaerythritol, dithiothreitol, 1,3-diphenylpropane-2,2-dithiol, 1,3-dihydroxy-2-propyl 2',3'-dimercaptopropyl ether, 2,3-dihydroxypropyl 2',3'-dimercaptopropyl ether, 2,6-dimethyloctane-2,6-dithiol, 2,6-dimethyloctane-3,7-dithiol, 2,4-dimethylbenzene-1,3-dithiol, 4,5-dimethylbenzene-1,3-dithiol, 3,3-dimethylbutane-2,2-dithiol, 2,2-dimethylpropane-1,3-dithiol, 1,3-di(4-methoxyphenyl) propane-2,2-dithiol, 3,4-dimethoxybutane-1,2-dithiol, 10,11-dimercaptoundecanoic acid, 6,8-dimercaptooctanoic acid, 2,5-dimercapto-1,3,4-thiadiazole, 2,2'-dimercaptobiphenyl, 4,4'-dimercaptobiphenyl, 4,4'-dimercaptobibenzyl, 3,4-dimercaptobutanol, 3,4-dimercaptobutyl acetate, 2,3-dimercapto-1-propanol, 1,2-dimercapto-1,3-butanediol, 2,3-dimercaptopropionic acid, 1,2-dimercaptopropyl methyl ether, 2,3-dimercaptopropyl 2',3'-dimethoxypropyl ether, 3,4-thiophenedithiol, 1,10-decanedithiol, 1,12-dodecanedithiol, 3,5,5-trimethylhexane-1,1-dithiol, 2,5-toluenedithiol, 3,4-toluenedithiol, 1,4-naphthalenedithiol, 1,5-naphthalenedithiol, 2,6-naphthalenedithiol, 1,9-nonanedithiol, norbornene-2,3-dithiol, bis(2-mercaptoisopropyl)ether, bis(11-mercaptoundecyl)sulphide, bis(2-mercaptoethyl)ether, bis(2-mercaptoethyl)sulphide, bis(18-mercaptoctadecyl)sulphide, bis(8-mercaptooctyl)sulphide, bis(12-mercaptodecyl)sulphide, bis(9-mercaptononyl)sulphide, bis(4-mercaptobutyl)sulphide, bis(3-mercaptopropyl)ether, bis(3-mercaptopropyl)sulphide, bis(6-mercaptohexyl)sulphide, bis(7-mercaptoheptyl)sulphide, bis(5-mercaptopentyl)sulphide, 2,2-bis(mercaptomethyl)acetic acid, 1,1-bis(mercaptomethyl)cyclohexane, bis(mercaptomethyl)durene, phenylmethane-1,1-dithiol, 1,2-butanedithiol, 1,4-butanedithiol, 2,3-butanedithiol, 2,2-butanedithiol, 1,2-propanedithiol, 1,3-propanedithiol, 2,2-propanedithiol, 1,2-hexanedithiol, 1,6-hexanedithiol, 2,5-hexanedithiol, 1,7-heptanedithiol, 2,6-heptanedithiol, 1,5-pentanedithiol, 2,4-pentanedithiol, 3,3-pentanedithiol, 7,8-heptadecanedithiol, 1,2-benzenedithiol, 1,3-benzenedithiol, 1,4-benzenedithiol, 2-methylcyclohexane-1,1-dithiol, 2-methylbutane-2,3-dithiol, ethylene glycol dithioglycolate or ethylene glycol bis(3-mercaptopropionate). Mention may be made, among trithiols, of 1,2,3-propanetrithiol, 1,2,4-butanetrithiol, trimethylolpropane trithioglycolate, trimethylolpropane tris(3-mercaptopropionate), pentaerythritol trithioglycolate, pentaerythritol tris(3-mercaptopropionate), 1,3,5-benzenetrithiol and 2,4,6-mesitylenetrithiol.

Mention may also be made, among polythiols of use in the compositions of the present invention, of neopentanetetrathiol, 2,2-bis(mercaptomethyl)-1,3-propanedithiol, pentaerythritol tetrakis(3-mercaptopropionate), 1,3,5-benzenetrithiol, 2,4,6-toluenetrithiol, 2,4,6-methylenetrithiol and polythiols corresponding to the formulae:

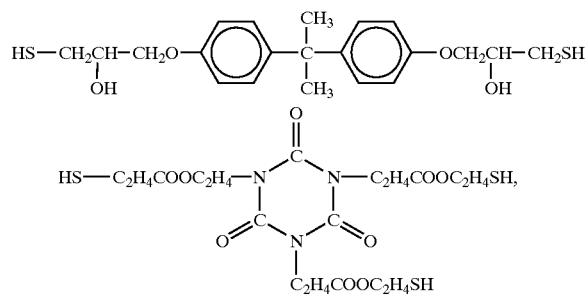

$(HSCH_2CH_2COOCH_2)_3CC_2H_5$ (TMPT), and 4-mercaptomethyl-3,6-dithia-1,8-octanedithiol.

Preferred polythiols according to the present invention are ethylene glycol bis(thioglycolate), trimethylolpropane tris(3-mercaptopropionate), pentaerythritol tetrakis(thiopropionate) (PETP), 4-mercaptomethyl-3,6-dithia-1,8-octanedithiol (MDO) and bis(2-mercaptoethyl)sulphide (DMDS).

The polythiol component is generally present in the polymerizable compositions in a proportion of 5 to 60% by weight, preferably of 10 to 50% by weight and better still of 20 to 50% by weight with respect to the total weight of monomers present in the composition.

The second essential monomer constituent of the polymerizable compositions for the manufacture of the ophthalmic lenses according to the invention is a copolymerizable monomer with a high Abbe number comprising two to four end groups generally chosen from groups of formulae:

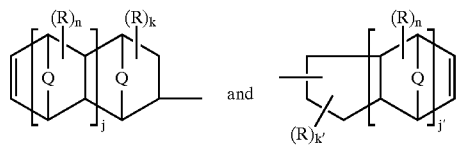

preferably groups of formulae:

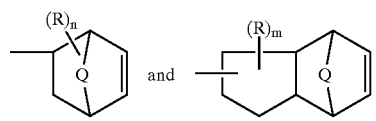

in which Q, R, n, m, k, k', j and j' are defined as above.

The copolymerizable monomers with a high Abbe number comprising two or more bridged cyclic end groups which are preferred, as defined above, generally correspond to the formula:

$$Z{-}(A)_{n^a} \tag{I}$$

in which $n^a$ is an integer from 2 to 4 and A is a radical chosen from radicals of formulae:

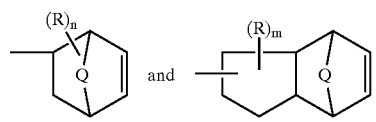

in which Q represents $-C(R')_2-$, $-O-$, $-S-$, $-SO_2-$ and $-NR'-$, where R' represents H or a $C_1$–$C_3$ alkyl radical, preferably $CH_3$, R represents H or a $C_1$–$C_3$ alkyl radical, preferably $CH_3$, n=0–5 and m=0–8, and (I) when $n^a$=2, Z represents a divalent radical of a formula:

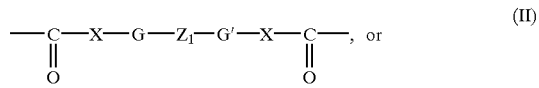 (II)

 (III)

 (III)

in which formulae X represents $-O-$ or $-S-$, G and G' are $-(C_nH_{2n'}O)_{m'}$ groups, with n'=1 to 5, preferably n'=2, and m' varies from 0 to 10, or a $C_1$–$C_5$ alkylene group, $Z_1$ is chosen from divalent radicals of formulae:

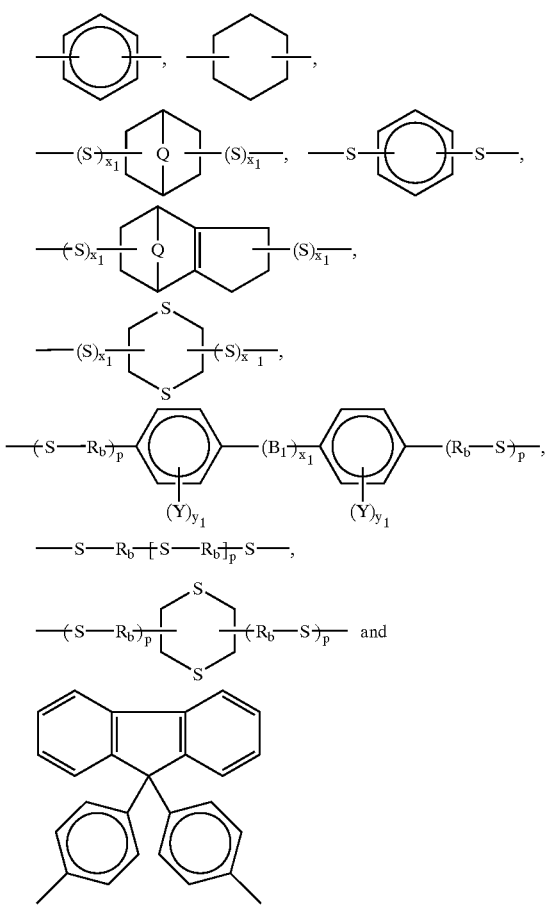

in which formulae Q is defined as above, $B_1$ represents —$C(R_2)_2$— or —S—, $R_2$ is a $C_1$–$C_3$ alkyl radical, preferably —$CH_3$, $x_1$=0 or 1, $Y_1$ represents, independently of one another, Br, Cl or H, $y_1$ is an integer from 0 to 4, the $R_b$ groups denote, independently of one another, a —$(CH_2)_q$— group, q is an integer from 1 to 4, preferably equal to 1 or 2, and p is an integer from 0 to 4, preferably from 0 to 2; and $Z_2$ is a divalent radical chosen from radicals of formulae:

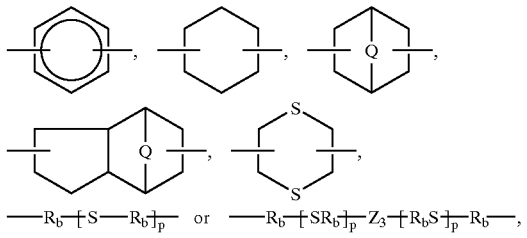

where Q, $R_b$ and p are defined as above and $Z_3$ is a divalent radical chosen from:

where Q and $x_1$ are defined as above;

(II) when $n^a$=3, Z represents a trivalent radical chosen from:

where $R_b$ and p are defined as above and $R_c$ represents H or a $C_1$–$C_3$ alkyl group, preferably —$CH_3$; and (III) when $n^a$=4, Z represents a tetravalent radical chosen from the following radicals:

$C$—$(R_3)_4$—, where $R_3$ is a $C_1$–$C_5$ alkylene radical or a

—$(SR_b)_p$S— radical where $R_b$ and p are defined as above.

A first class of monomer constituents comprising bridged cyclic end groups coming within the scope of the above general formula (I) are monomers of formula:

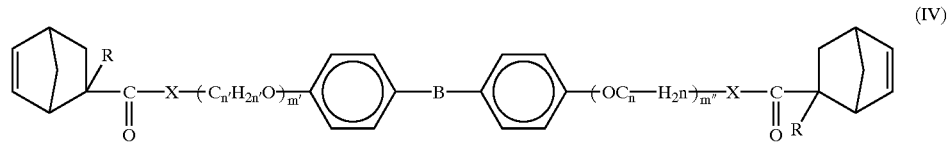

(IV)

where R and X are defined as above, B is —S— or —C(CH$_3$)$_2$—, n' and n"=1 to 5 and m' and m" vary from 0 to 10.

A recommended monomer of formula (IV) is the compound of formula:

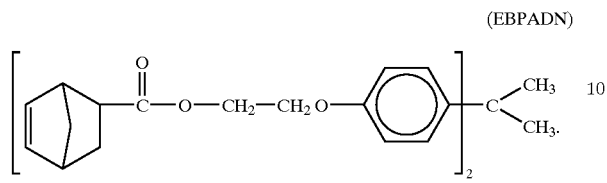

(EBPADN)

Monomers corresponding to the formula (IV), and the process for their preparation, are disclosed in Patent Document WO 88/02902.

Another recommended class of monomer constituents comprising two bridged cyclic end groups according to the invention are monomers of formula:

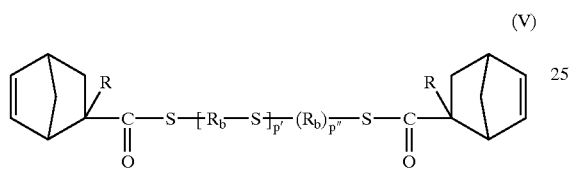

(V)

where R=H or CH$_3$, R$_b$ is as defined above, preferably a propylene radical, p' is an integer from 1 to 3, preferably equal to 2, and p" is an integer equal to 0 or 1.

A recommended monomer of formula (V) is the monomer of formula:

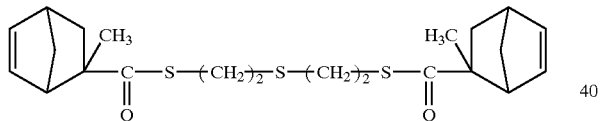

(MESDTMN) or mercaptoethyl sulphide dithiomethnorbornenecarboxylate.

These compounds of formula (V) are new.

Mention may be made, among monomers of formula (III) above, of monomers in which Z$_2$ represents the following groups:

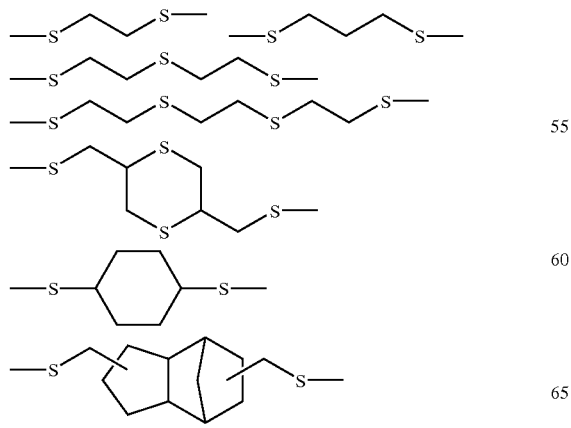

Such monomers, and the process for their preparation, are disclosed in Patent Document JP-81 51360.

Mention may be made, among recommended trivalent monomer constituents comprising bridged cyclic end groups, of monomers of formulae:

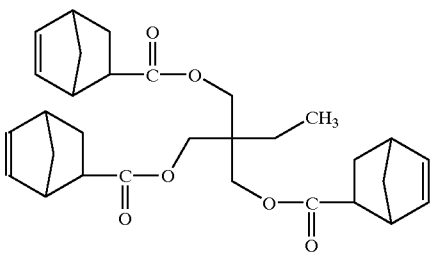

and

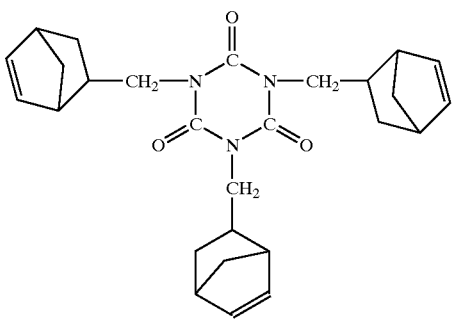

Compounds of this type, in particular tris(norbornenyl) isocyanurate, are disclosed in U.S. Pat. No. 5,182,360.

The monomer constituent or constituents comprising bridged cyclic end groups according to the invention are generally present in the polymerizable composition in a proportion of 10 to 70% by weight with respect to the total weight of the monomer constituents, preferably in a proportion of 20 to 70% by weight and better still in a proportion of 30 to 70% by weight.

Monomers of formula (II) in which X represents —S— are new products.

The polymerizable compositions according to the invention can also comprise other additional monomers which are copolymerizable with the above monomers, in particular thio(meth)acrylate monomers, such as monomers corresponding to the formula:

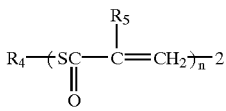 (VI)

in which:

$R_4$ represents a linear or branched, monovalent or polyvalent, aliphatic hydrocarbonaceous radical or a monovalent or polyvalent, aromatic or heterocyclic group bonded directly to the sulphur atom of the thio(meth)acrylate group or groups by a nucleus or via a linear alkyl chain, it being possible for the $R_4$ radical to comprise, in its chain, one or more groups chosen from —O—, —S— or

$R_5$ represents hydrogen or —CH$_3$; and $n^2$ is an integer from 1 to 6, preferably from 1 to 3.

Mention may be made, among monovalent $R_4$ radicals, of linear or branched $C_1$ to $C_5$ alkyl radicals or radicals of formula:

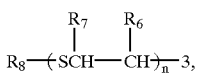

in which:

$R_6$ and $R_7$ are, independently of one another, H or a linear or branched $C_1$–$C_5$ alkyl radical;

$R_8$ is a linear or branched $C_1$–$C_5$ alkyl radical, a $C_7$–$C_{10}$ aralkyl radical or a $C_6$–$C_{12}$ aryl radical which is optionally substituted, in particular by alkyl and/or halogen groups; and $n^3$ is an integer from 1 to 4.

Mention may be made, among preferred monovalent $R_4$ radicals, of:

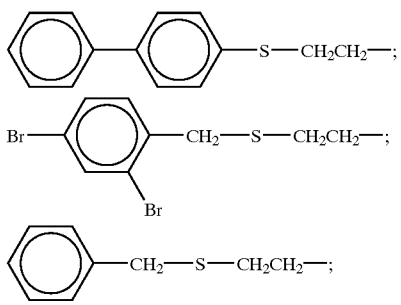

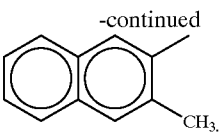

Monomers of formula (VI) for which $n^2=1$ and which are as defined above are disclosed, inter alia, in Patents U.S. Pat. No. 4,606,864, JP-63316766 and EP-A-0,384,725.

Mention may be made, among divalent $R_4$ radicals coming within the context of the monomers of formula (VI), of linear or branched $C_2$ to $C_{10}$ alkylene radicals which can comprise, in their chain, one or more —O—, —S— or

groups, alkylidene radicals of formula

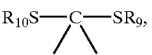

in which $R_9$ and $R_{10}$ are $C_1$–$C_5$ alkyl radicals, radicals of formula:

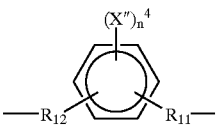

in which $R_{11}$ and $R_{12}$ are linear or branched $C_1$–$C_5$ alkylene groups which can comprise one or more —O—, —S— or

groups in their chains, X" is chosen from $C_1$–$C_5$ alkyl radicals and halogens, and $n^4$ is an integer from 0 to 4, and radicals of formula:

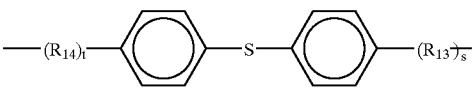

in which $R_{13}$ and $R_{14}$ are linear or branched $C_1$ to $C_5$ alkylene radicals which can comprise, in their chain, one or more —O—, —S— or

groups and t and s are equal to 0 or 1.

Mention may be made, among preferred divalent $R_4$ radicals, of the following radicals:

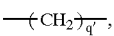

where q' is an integer from 1 to 8;

where X is —O— or —S— and u is an integer from 1 to 4;

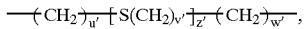

where z' is equal to 0 or 1 and u', v' and w' are integers from 2 to 6;

where u" and v" are integers from 1 to 4,

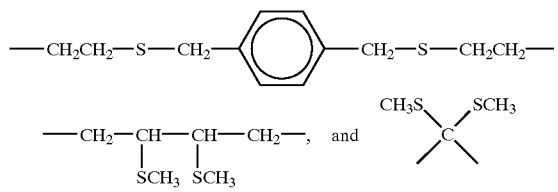

Particularly preferred divalent $R_4$ radicals are:

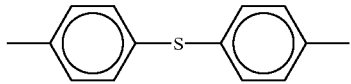

and —$C_2H_4$—S—$C_2H_4$—.

Divalent monomers of formula (VI) are disclosed, inter alia, in Patents EP-A-273,661, EP-A-273,710 and EP-A-384,725.

Mention may be made, among trivalent $R_4$ radicals of the monomers of formula (VI), of $C_3$ to $C_{10}$ alkyltriyl radicals which can comprise, in their chain, one or more —O—, —S— or

groups, trivalent alkylaryl radicals, the alkyl chains of which comprise one or more —S— or —O— groups, and trivalent aryl groups.

Mention may be made, among trivalent $R_4$ radicals or $R_4$ radicals with a higher valency, of:

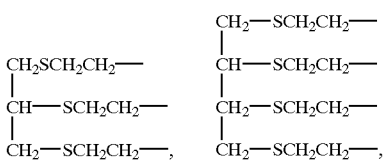

and the like.

Mention may be made, among monomers of formula (VI) recommended in the present invention, of:

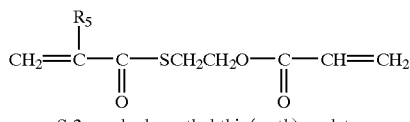

S-2-acryloyloxyethyl thio(meth)acrylate,

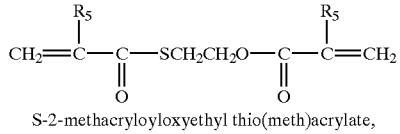

S-2-methacryloyloxyethyl thio(meth)acrylate,

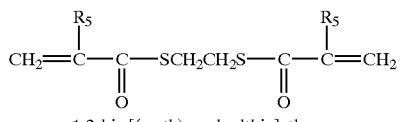

1,2-bis [(meth)acryloylthio]ethane,

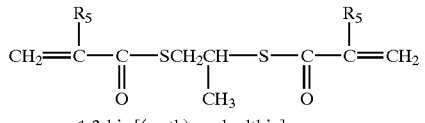

1,2-bis [(meth)acryloylthio]propane,

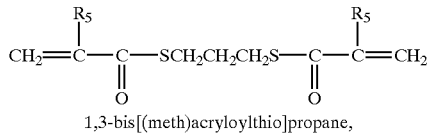

1,3-bis[(meth)acryloylthio]propane,

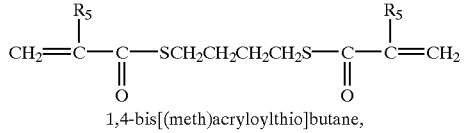

1,4-bis[(meth)acryloylthio]butane,

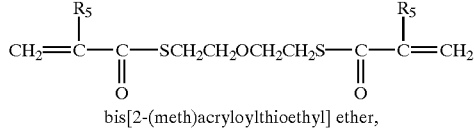

bis[2-(meth)acryloylthioethyl] ether,

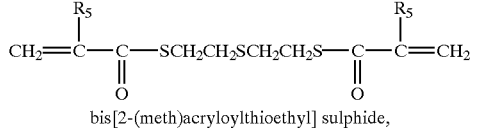

bis[2-(meth)acryloylthioethyl] sulphide,

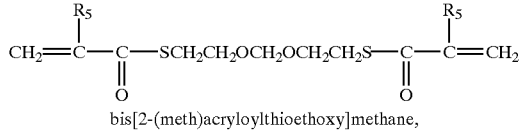

bis[2-(meth)acryloylthioethoxy]methane,

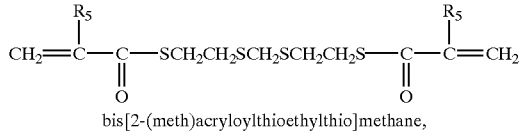

bis[2-(meth)acryloylthioethylthio]methane,

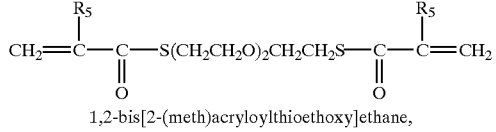

1,2-bis[2-(meth)acryloylthioethoxy]ethane,

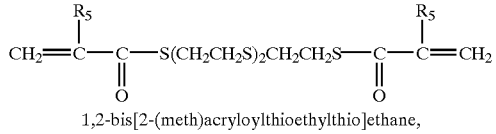

1,2-bis[2-(meth)acryloylthioethylthio]ethane,

-continued

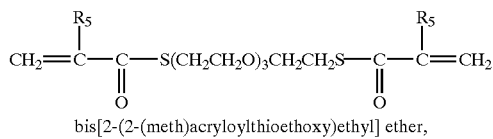
bis[2-(2-(meth)acryloylthioethoxy)ethyl] ether,

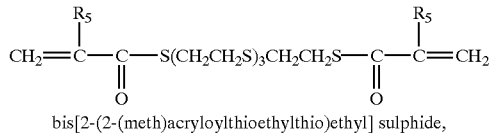
bis[2-(2-(meth)acryloylthioethylthio)ethyl] sulphide,

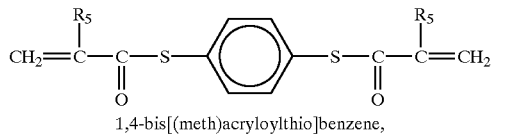
1,4-bis[(meth)acryloylthio]benzene,

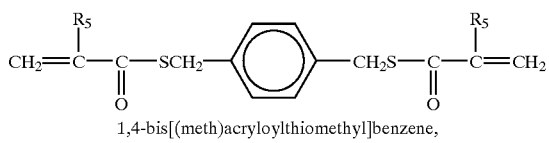
1,4-bis[(meth)acryloylthiomethyl]benzene,

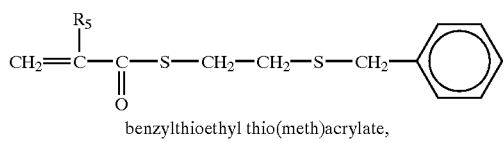
benzylthioethyl thio(meth)acrylate,

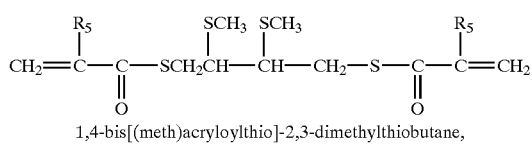
1,4-bis[(meth)acryloylthio]-2,3-dimethylthiobutane,

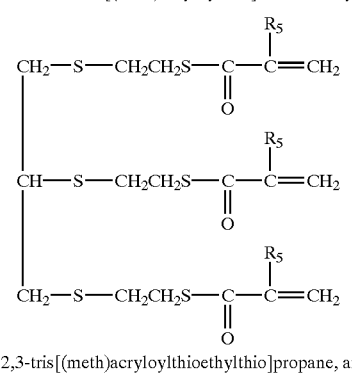
1,2,3-tris[(meth)acryloylthioethylthio]propane, and

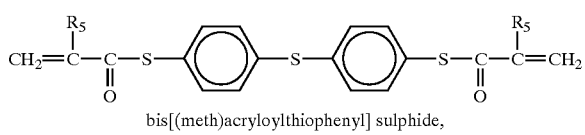
bis[(meth)acryloylthiophenyl] sulphide, where $R_5$ represents a hydrogen atom or a methyl group.

Very particularly recommended monomers in the present invention are bis(4-methacryloylthiophenyl)sulphide (BMTPS) and bis(2-methacryloylthioethyl)sulphide (BMTES).

Another class of thio(meth)acrylic monomers suitable in the compositions comprising monomers according to the invention corresponds to the formula:

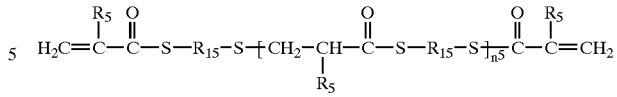
(VII)

in which $R_5$ represents H or $CH_3$, $R_{15}$ represents an optionally branched $C_2$–$C_{12}$ alkylene group, a $C_3$–$C_{12}$ cycloalkylene group, a $C_6$–$C_{14}$ arylene group or a $C_7$–$C_{26}$ alkarylene group, it being possible for the carbonaceous chain of the $R_{15}$ group to be interrupted by one or more ether or thioether groups, and $n^5$ is an integer from 1 to 6.

Such monomers are disclosed in U.S. Pat. No. 5,384,379.

These copolymerizable comonomers, when they are present, can represent from 10 to 60% by weight of the composition with respect to the total weight of monomers present, preferably 20 to 50% by weight.

The polymerizable compositions according to the invention can also comprise additives conventionally used in polymerizable compositions for the moulding of optical articles, in particular spectacle glasses, in conventional proportions, namely inhibitors, colorants, UV absorbers, fragrances, deodorants, antioxidants and anti-yellowing absorbents.

Mention may be made, as preferred examples of antioxidizing agents, of triphenylphosphine (TPP) and Irganox® 1010 (pentaerythritol tetrakis[3-(3,5-di-tert-butyl-4-hydroxyphenyl)propionate] (CG1010).

Fragrances make it possible to mask the odour of the compositions, in particular during surface working operations.

The compositions according to the invention generally comprise polymerization initiators, preferably photoinitiators or mixtures of photoinitiators and of thermal initiators, in a proportion of 0.001 to 5% by weight with respect to the total weight of polymerizable monomers present in the composition.

Mention may in particular be made, among photoinitiators which can be used in the polymerizable compositions according to the invention, of 2,4,6-trimethylbenzoyldiphenylphosphine oxide, 1-hydroxycyclohexyl phenyl ketone, 2,2-dimethoxy-1,2-diphenylethan-1-one, alkylbenzoyl ethers, the photoinitiator sold by the Company Ciba-Geigy under the name CGI 1700, which is a 25/75 mixture of a compound of formula:

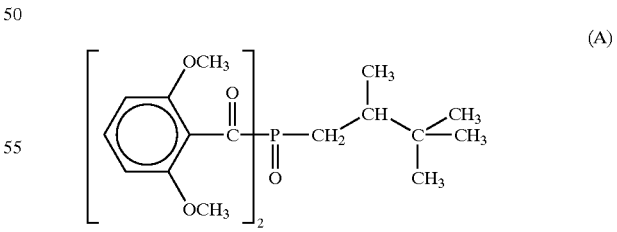
(A)

and of a compound of formula:

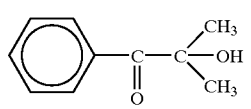
(B)

and the photoinitiator CGI 1850 sold by the Company Ciba-Geigy, which is a mixture (50/50) (by weight) of compound A and of Irgacure® 184 of formula:

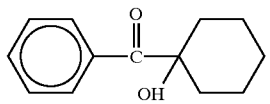

As indicated above, the preferred polymerizable compositions according to the invention are photopolymerizable compositions comprising one or more photoinitiators.

More preferably, the polymerizable compositions according to the invention are photo- and thermopolymerizable compositions comprising both a polymerization photoinitiator and a polymerization thermal initiator.

Thermal polymerization initiators are compounds which are well known in the art and mention may be made, among them, of peroxides, such as benzoyl peroxide, cyclohexyl peroxydicarbonate and isopropyl peroxydicarbonate.

Monomers of formula (I) can be synthesized either by a Diels-Alder reaction between a compound comprising two or more (meth)acrylate or thio(meth)acrylate functional groups and a cycloalkene, such as cyclopentadiene or norbornadiene, or by addition of thiol/ene type between a polythiol compound and an ene compound, such as cyclopentadiene, norbornadiene, vinylnorbornene or ethylidenenorbornene.

The polythiol compound and the ene compound are reacted in proportions corresponding substantially to one thiol group of the polythiol compound or compounds per mole of ene compound.

By way of example, the scheme is shown below for the synthesis of monomers with a high Abbe number according to the invention from 5-vinyl-2-norbornene or 5-ethylidene-2-norbornene with a dithiol:

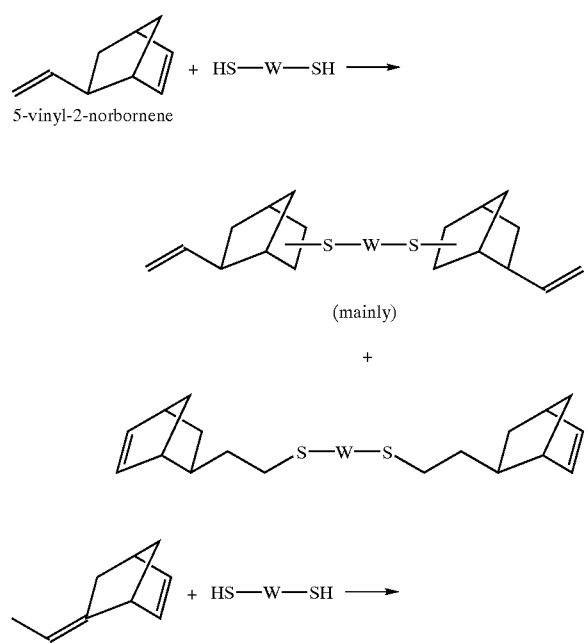

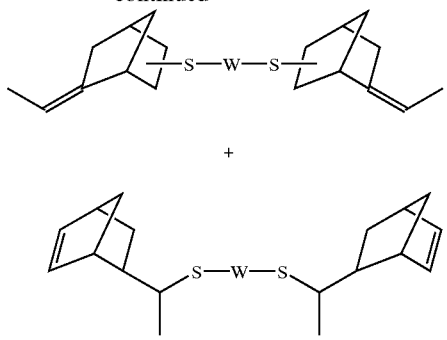

where W is an aliphatic or aromatic radical.

In the following examples, except when otherwise indicated, all the parts and percentages are expressed by weight.

Examples of the Synthesis of Monomers of Formula (I) by the Diels-Alder Reaction 1) Synthesis of Bisphenol A 2-ethoxylate Dinorbornenecarboxylate (EBPADN)

700 g of bisphenol A 2-ethoxylate diacrylate (EBPADA), Sartomer® SR 349, are introduced into a three-necked flask equipped with a mechanical stirrer, a dropping funnel for introducing reactant and a condenser. The EBPADA had a refractive index $n_D$ at 21° C. at 1.5465 and a relative density of 21° C. of 1.1478.

The acrylic monomer is then degassed by means of a roughing vacuum pump and then dinitrogen is introduced into the three-necked flask. 198 g of freshly cracked cyclopentadiene (CPD) are then added dropwise via the dropping funnel. The temperature of the reaction mixture rises as the Diels-Alder reaction between the cyclopentadiene and the diacrylate takes place. The excess cyclopentadiene is then discharged by alternating the vacuum by means of the roughing vacuum pump and the introduction of dinitrogen into the three-necked flask. Discharge of the excess cyclopentadiene is brought to completion by means of a rotary evaporator. If the presence of impurities is observed, the monomer obtained is then filtered by means of a vacuum flask.

The expected product, EBPADN, is obtained with a yield of 93.53%, this product having a molar mass of 556, a refractive index $n_D$ at 21° C. of 1.5497 and a relative density at 21° C. of 1.1569.

2) Syntheses of Trimethylolpropane Trinorbornenecarboxylate (TMPTN)

The synthesis is carried out as in the preceding synthetic example but without final discharge of the excess CPD by means of a rotary evaporator, in order to prevent the product from setting solid.

In this synthesis, use was made of 338 g of trimethylolpropane triacrylate, molar mass 296, refractive index $n_D$ at 21° C. of 1.4752 and relative density at 21° C. of 1.10067, which product is sold by the Company Cray Valley under the reference SR 351, and 217 g of cyclopentadiene were added.

The expected product, TMPTN, was obtained with a yield of greater than 95%, this product having a molar mass of 494, a refractive index $n_D$ at 21° C. of 1.511 and a relative density at 21° C. of 1.146.

3) Synthesis of Mercaptoethyl Sulphide Dithiomethnorbornenecarboxylate (MESDTMN)

The synthesis is carried as in the first synthetic example, using 211 g of bis[(2-methacryloylthio)ethyl]sulphide (BMTES); molar mass 282, $n_D$ at 21° C. 1.5745, relative density 21° C. 1.177, as starting material and 100 g of cyclopentadiene.

The expected product (MESDTMN) is obtained with a yield of greater than 95%, this product having a molar mass of 414, a refractive index $n_D$ at 21° C. of 1.5683 and a relative density at 21° C. of 1.1588.

It should be noted that the reactivity of a thiomethacrylate is much greater than that of the corresponding methacrylate (which would have required a catalyst of the Lewis acid type for the reaction).

4) Examples of Synthesis from 5-vinyl-2-norbornene and from 5-ethylidene-2-norbornene

SYNTHETIC EXAMPLE 1

12.6 g of 5-vinyl-2-norbornene (purity 95%) are introduced into a reactor equipped with a condenser, a magnetic stirrer and a nitrogen feed allowing the synthesis to be carried out under an inert atmosphere. Heating is carried out to 70° C. and 8.5 g of 2-mercaptoethyl sulphide are added over 30 minutes using a dropping funnel. During the addition, exothermicity is observed and the temperature of the reaction mixture reaches 165° C. The reaction is monitored by infrared spectroscopy until the —S—H band at 2571 cm$^{-1}$ has completely disappeared. The product exhibits a refractive index of 1.571 at 25° C.

SYNTHETIC EXAMPLE 2

The synthesis is carried out in the same way as in Synthetic Example 1, using 11.2 g of 4-mercaptomethyl-3,6-dithia-1,8-octanedithiol (purity 93%) and 15.2 g of 5-vinyl-2-norbornene. The maximum temperature reached during the addition of the thiol is 79° C. The product obtained exhibits a refractive index of 1.579 at 25° C.

SYNTHETIC EXAMPLE 3

The synthesis is carried out in the same way as in Synthetic Example 1, using 12.2 g of pentaerythritol tetrakis (3-mercaptopropionate) and 12.6 g of 5-vinyl-2-norbornene. The maximum temperature reached during the addition of the thiol is 134° C. The product obtained exhibits a viscosity of 0.48 Pa·s at 25° C. and a refractive index of 1.531 at 25° C.

SYNTHETIC EXAMPLE 4

The synthesis is carried out in the same way as in Synthetic Example 1, using 12.2 g of pentaerythritol tetrakis (3-mercaptopropionate) and 12 g of 5-ethylidene-2-norbornene (purity 99%). The maximum temperature reached during the addition of the thiol is 95° C. The product obtained exhibits a viscosity of 7.66 Pa·s at 25° C. and a refractive index of 1.5445 at 25° C.

Compositions 1 to 6 of the invention were prepared by mixing the constituents shown in Table I hereinbelow.

These compositions are subsequently cast in a two-part mould made of inorganic glass and polymerized in order to obtain ophthalmic lenses according to the invention.

The refractive index at 21° C., the Abbe number, the relative density at 21° C. the glass transition temperature, the suitability for colouring and the odour were determined with regard to these lenses.

TABLE I

| | Polymerizable compositions (parts by weight) | | | | | |
|---|---|---|---|---|---|---|
| | 1 | 2 | 3 | 4 | 5 | 6 |
| Monomers of formula (I) | | | | | | |
| EBPADN | 30 | 30 | 30 | 66 | 50 | 50 |
| Polythiol | | | | | | |
| DMDS | 20 | — | 10 | — | — | 40 |
| MDO | — | 50 | 30 | — | 50 | — |
| PETP | — | — | — | 33 | — | — |
| Other polymerizable comonomers | | | | | | |
| BMTES | 50 | 20 | 30 | — | — | — |
| THEIC-TA | — | — | — | — | — | 10 |
| Adjuvants | | | | | | |
| CGI 1850 (photoinitiator) | 0.015% | 0.015% | 0.015% | 0.015% | 0.015% | 0.015% |
| TBPEH | 0.1% | 0.1% | 0.1% | 0.1% | 0.1% | 0.1% |
| UV 5411 (UV absorber) | 0.07% | 0.07% | 0.07% | 0.07% | 0.07% | 0.07% |
| $n^{21}$ | 1.602 | 1.631 | 1.623 | 1.575 | 1.631 | 1.612 |
| vd | 42 | 39 | 38 | 43 | 40 | 41 |
| $d_{21}$ | 1.22 | 1.25 | — | 1.21 | 1.24 | 1.22 |
| $T_g$ (° C.) | 89 | 90 | 75 | 85 | | |
| Suitability for colouring | YES | YES | YES | YES | YES | YES |
| Odour | NO | slight | NO | NO | slight | slight |

EBPADN Bisphenol A 2-ethoxylate dinorbornenecarboxylate
DMDS Dimercaptodiethyl sulphide
MDO 4-Mercaptomethyl-3,6-dithia-1,8-octanedithiol
PETP Pentaerythritol tetrakis (thiopropionate)
BMTES Bis[2-(methacryloylthio)ethyl] sulphide
THEIC-TA Tris(acryloyl) isocyanurate
TBPEH t-Butyl peroxy(2-ethylhexanoate)

What is claimed is:

1. An ophthalmic lens composed of a transparent organic polymer material with a high refractive index and a high Abbe number, resulting from the polymerization of a mixture of monomers comprising:
at least one polythiol monomer; and
at least one monomer with a high Abbe number, wherein the monomer with a high Abbe number is of formula:

$$Z\text{-}(A)_{n^a}$$

where A is a bridged cyclic group comprising an intracyclic ethylenic double bond or a linear or branched aliphatic residue comprising an ethylenic unsaturation and $n^a$ is an integer from 2 to 4, and (I) when $n^a=2$, Z is a divalent radical of formulae:

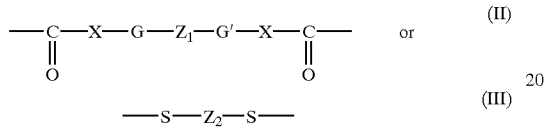

in which formulae X represents —O— or —S—, G and G' are —$(C_{n'}H_{2n'}O—)_{m'}$ groups, with n'=1 to 5 and m' varies from 0 to 10, or a $C_1$–$C_5$ alkylene group, $Z_1$ is chosen from divalent radicals of formulae:

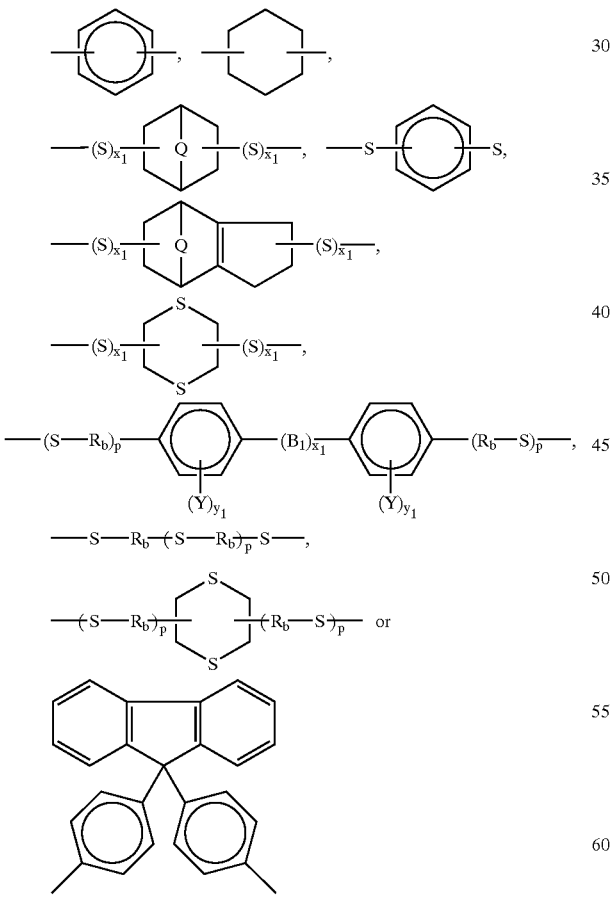

in which formulae Q represents a divalent radical chosen from —$C(R')_2$-, —O—, —S—, —$SO_2$— and —NR'—, R' being a hydrogen atom or a $C_1$–$C_3$ alkyl radical, $B_1$ is a divalent radical chosen from —$C(R_2)_2$—, —S— and —$SO_2$—, where $R_2$ is a $C_1$–$C_3$ alkyl radical, $x_1=0$ or 1, $Y_1$ independently represents Br, Cl or H, $y_1$ is an integer from 0 to 4, $R_b$ is a —$(CH_2)$—$_q$ group, q being an integer from 1 to 4, and p is an integer from 0 to 4, and $Z_2$ is a divalent radical chosen from radicals of formulae:

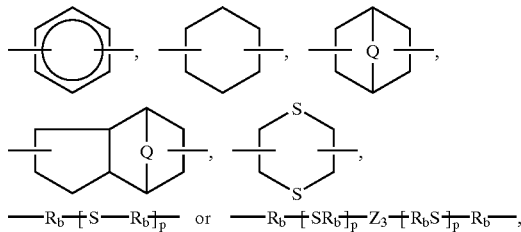

where Q, $R_b$ and p are defined as above and $Z_3$ is a divalent radical chosen from:

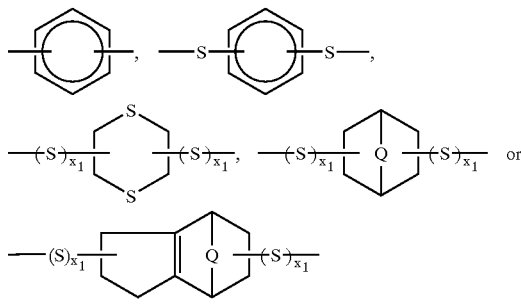

where Q and $X_1$ are defined as above;

(II) when $n^a=3$, Z represents a trivalent radical chosen from:

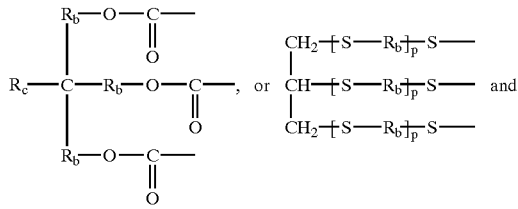

where $R_b$ and p are defined as above and $R_c$ represents H or a $C_1$–$C_3$ alkyl group; and (III) when $n^a=4$, Z represents a tetravalent radical of formula:

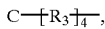

where $R_3$ is a $C_1$–$C_5$ alkylene radical or a divalent radical of formula:

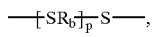

where $R_b$ and p are defined above.

2. Ophthalmic lens according to claim 1, characterized in that the bridged cyclic end groups are chosen from groups of formulae:

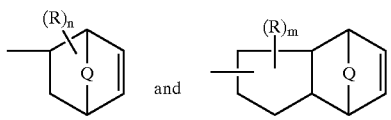

in which Q represents a divalent radical chosen from —C(R')$_2$-, —O—, —S—, —SO$_2$— and —NR'—, R' being a hydrogen atom or a C$_1$–C$_3$ alkyl radical, and R represents a hydrogen atom or a C$_1$–C$_3$ alkyl radical, n=0 to 5 and m=0 to 8.

3. Ophthalmic lens according to claim 1, wherein the monomer with a high Abbe number corresponds to the formula:

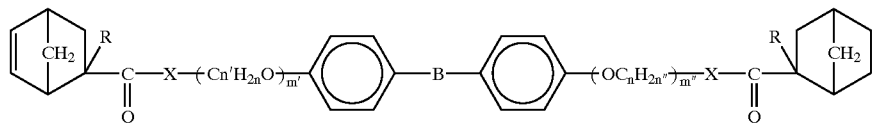

where X is —O— or —S—, B is —S— or —C(CH$_3$)$_2$—, R is H or CH$_3$, n' and n"=1 to 5 and m' and m" vary from 0 to 10.

4. An ophthalmic lens composed of a transparent organic polymer material with a high refractive index and a high Abbe number, resulting from the polymerization of a mixture of monomers comprising:

at least one polythiol monomer; and at least one monomer with a high Abbe number, wherein the monomer with a high Abbe number is of formula:

Z—(A)$_{n^a}$ where A is a bridged cyclic group comprising an intracyclic ethylenic double bond or a linear or branched aliphatic residue comprising an ethylenic unsaturation and n$^a$ is an integer from 2 to 4, and (I) when n$^a$=2, Z is a divalent radical of formulae:

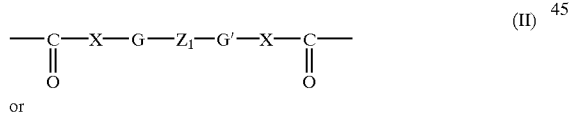 (II)

or

 (III)

in which formulae X represents —O— or —S—, G and G' are —(C$_{n'}$H$_{2n'}$O)—$_{m'}$ groups, with n'=1 to 5, preferably n'=2, and m' varies from 0 to 10, or a C$_1$–C$_5$ alkylene group, Z$_1$ is chosen from divalent radicals of formulae:

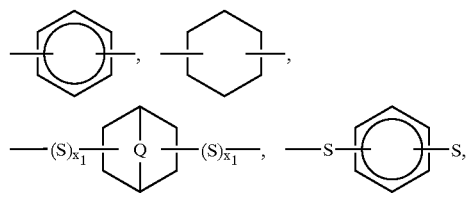

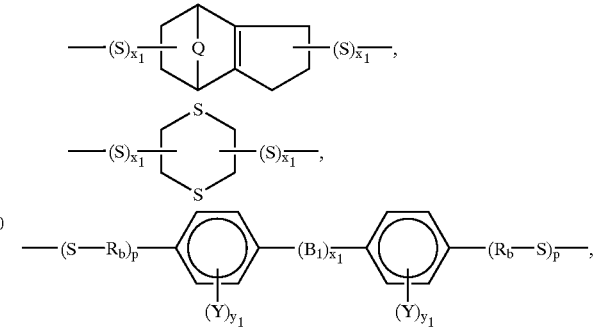

-continued

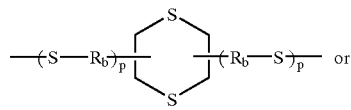

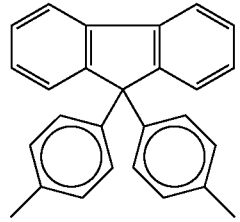 or in which formulae Q represents a divalent radical chosen from —C(R')$_2$-, —O—, —S—, —SO$_2$— and —NR'—, R' being a hydrogen atom or a C$_1$–C$_3$ alkyl radical, B$_1$ is a divalent radical chosen from —C(R$_2$)$_2$-, —S— and —SO—$_2$—, where R$_2$ is a C$_1$–C$_3$ alkyl radical, x$_1$=0 or 1, Y$_1$ independently represents Br, Cl or H, y$_1$ is an integer from 0 to 4, R$_b$ is a —(CH$_2$)—$_q$ group, q being an integer from 1 to 4, and p is an integer from 0 to 4, and Z$_2$ is a divalent radical chosen from radicals of formulae:

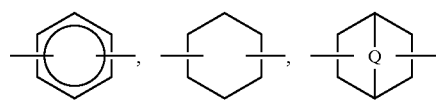

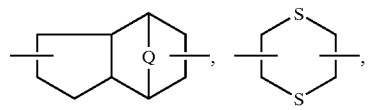

where Q, R$_b$ and p are defined as above and Z$_3$ is a divalent radical chosen from:

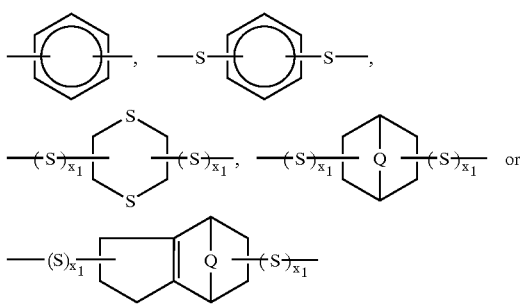

where Q and $X_1$ are defined as above;

(II) when $n^a=3$, Z represents a trivalent radical chosen from:

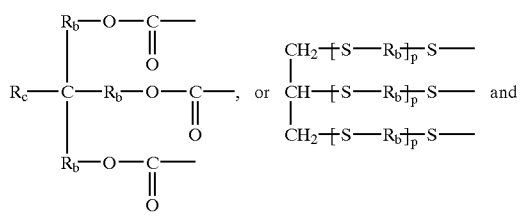

where $R_b$ and p are defined as above and $R_c$ represents H or a $C_1$-$C_3$ alkyl group; and (III) when $n^a=4$, Z represents a tetravalent radical of formula:

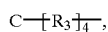

where $R_3$ is a $C_1$-$C_5$ alkylene radical or a divalent radical of formula:

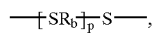

where $R_b$ and p are defined above.

5. Ophthalmic lens according to claim 1, wherein the monomer with a high Abbe number corresponds to the formula:

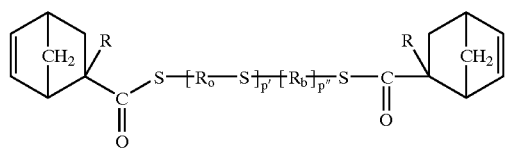

where R and $R_b$ are defined as above, p' is an integer from 1 to 3 and p" is an integer equal to 0 or 1.

6. Ophthalmic lens according to claim 5, wherein the monomer with a high Abbe number corresponds to the formula:

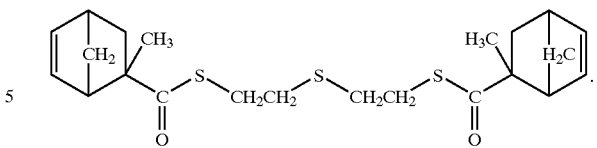

7. Ophthalmic lens according to claim 1, wherein the polythiol monomer has the formula $R_1 (SH)_n^1$, where $n^1$ is an integer at least equal to 2 and $R_1$ is an aliphatic, aromatic or heterocyclic radical.

8. Ophthalmic lens according to claim 7, wherein the polythiol monomer is a dithiol, a trithiol or a tetrathiol.

9. Ophthalmic lens according to claim 1, wherein the monomer composition comprises one or more other additional polymerizable comonomers.

10. Ophthalmic lens according to claim 9, wherein the other additional comonomer or comonomers are chosen from difunctional thio(meth)-acrylate monomers.

11. Ophthalmic lens according to claim 7, wherein the polythiol is chosen from 4-mercaptomethyl-3, 6-dithia-1, 8-octane-dithiol, bis(2-mercaptoethyl)sulphide or pentaerythriotol tetrakis(thiopropionate).

12. Ophthalmic lens according to claim 1, wherein the polythiol represents 10 to 60% by weight with respect to the total weight of polymerizable monomers present in the composition.

13. Ophthalmic lens according to claim 1, wherein the monomer with a high Abbe number represents 10 to 70% by weight with respect to the total weight of monomers present in the composition.

14. Ophthalmic lens according to claim 9, wherein the other additional polymerizable comonomers represent 10 to 50% by weight with respect to the total weight of monomers present in the composition.

15. A spectacle comprising an ophthalmic lens according to claim 1.

16. Ophthalmic lens according to claim 1, wherein A is chosen from groups of formulae:

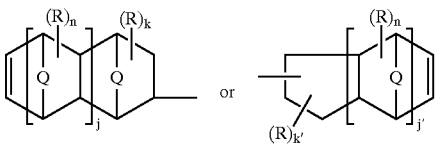

where n is an integer from 0 to 5 inclusive, k is an integer from 0 to 3 inclusive, j is an integer from 0 to 10 inclusive, k' is an integer from 0 to 2 inclusive and j' is an integer from 0 to 10 inclusive, Q represents a —C(R')$_2$—, —O—, —S—, —NR'— or —SO$_2$— group, with R' denoting H or a $C_1$-$C_3$ alkyl radical, and R is a hydrogen atom or C1–C3 alkyl radical.

17. The ophthalmic lens of claim 1, wherein n'=2.

* * * * *

UNITED STATES PATENT AND TRADEMARK OFFICE
CERTIFICATE OF CORRECTION

PATENT NO. : 6,533,815 B1  Page 1 of 1
DATED : March 18, 2003
INVENTOR(S) : Widawski It is certified that error appears in the above-identified patent and that said Letters Patent is hereby corrected as shown below:

Column 20,
Line 1, please delete "–SO–$_2$–" and insert -- –SO$_2$– -- therefor.

Column 21,
Line 15, please delete

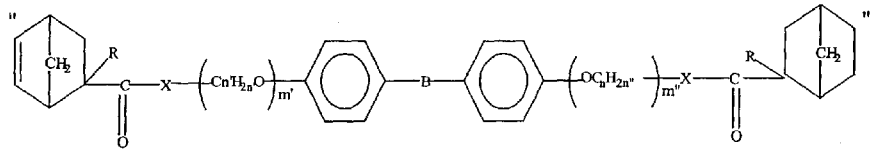

and insert

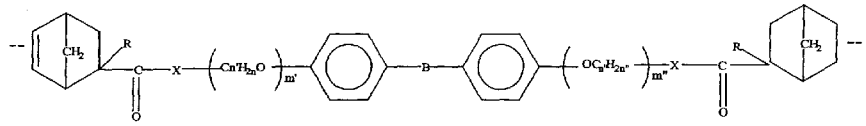

therefor.

Signed and Sealed this

Sixteenth Day of September, 2003

JAMES E. ROGAN
*Director of the United States Patent and Trademark Office*